United States Patent [19]

Leis et al.

[11] 3,988,779

[45] Oct. 26, 1976

[54] EDGE-LOADING TAPE DECK OR HOLDER

[75] Inventors: Michael D. Leis, Framingham; Thomas C. Stockebrand, Boxboro; Wilfred Y. Benson, Natick, all of Mass.

[73] Assignee: Digital Equipment Corporation, Maynard, Mass.

[22] Filed: June 30, 1976

[21] Appl. No.: 591,604

Related U.S. Application Data

[63] Continuation of Ser. No. 397,318, Sept. 14, 1973, abandoned.

[52] U.S. Cl. ............................... 360/96; 242/68.3; 242/198
[51] Int. Cl.² .................. G11B 23/04; G11B 15/32; B65H 17/02
[58] Field of Search .................. 360/96, 93, 94, 85, 360/91; 242/68.3, 198–200, 210, 180–181

[56] References Cited

UNITED STATES PATENTS

| | | | |
|---|---|---|---|
| 2,951,653 | 9/1960 | Haenel .............................. | 242/201 |
| 3,497,157 | 2/1970 | Hanes et al. ....................... | 242/198 |
| 3,552,671 | 1/1971 | Wood ................................ | 242/68.3 |
| 3,609,844 | 10/1971 | Ichikawa .......................... | 360/96 |
| 3,612,432 | 10/1971 | Johnson ............................. | 242/198 |
| 3,619,625 | 11/1971 | Wood ................................ | 360/93 |
| 3,684,295 | 8/1972 | Strain et al. ..................... | 360/96 |
| 3,756,521 | 9/1973 | Werner ............................. | 242/68.3 |
| 3,766,327 | 10/1973 | Johnson et al. .................... | 360/94 |
| 3,791,604 | 2/1974 | Meermans ......................... | 242/68.3 |

*Primary Examiner*—Alfred H. Eddleman
*Attorney, Agent, or Firm*—Cesari and McKenna

[57] ABSTRACT

An edge-loading tape deck or holder drives a tape cassette reel-to-reel. A pair of abutments on each side of the recording head inside the holder positions the active edge of the cassette relative to the head and the cassette is urged against these abutments by a spring-loaded door hinged to the holder and overlying the cassette. The door and cassette cooperate to help position the cassette in each of two stable positions within the holder. In one position, the cassette lies completely within the holder and the drive spindles project into the cassette sprocket holes. In the other position, the cassette is free of the drive spindles and projects partially out of the holder so that it is accessible. The cassette is secured in its two operative positions by a bistable latch which cooperates with the cassette so that when either the latch or the cassette is moved from one of its stable positions to the other, it moves the cooperating element between the element's stable positions. Also, the system's drive unit and spindle-sprocket hole configuration are specially designed to minimize down time due to malfunctions and jams.

9 Claims, 12 Drawing Figures

EDGE-LOADING TAPE DECK OR HOLDER

This is a continuation, of application Ser. No. 397,318 filed Sept. 14, 1973, now abandoned.

BACKGROUND OF THE INVENTION

This invention relates to a tape deck used to read on and write from magnetic tape in a cassette. It relates more particularly to an edge loading tape holder which drives the cassette reel-to-reel.

Edge-loading tape cassette holders are not new. An example of this type of unit is shown, for example, in U.S. Pat. No. 3,612,432. Generally, it includes a frame which supports the magnetic recording head. The frame has a resilient retainer adjacent the recording head which positions the active edge of the cassette so that an exposed section of tape engages the recording head. The frame also supports drive spindles to move the tape and a latch for retaining the opposite edge of the cassette.

The cassette is inserted active edge first into the holder and the retainer and latch position the cassette either in an operating plane or in a loading plane. In the former, the cassette is oriented so that the recording head engages the tape in the cassette and the drive spindles project into the usual sprocket holes in the side of the cassette. In the latter, the cassette is angled relative to the operating plane so that the head still engages the tape, but the cassette is free of the drive spindles and can be grasped by the operator and withdrawn from the tape deck. The latch engaging the opposite edge of the cassette is swingable by the operator between two positions to move the cassette between its two positions.

Edge-loading, reel-to-reel driving tape decks should have wide application, particularly in connection with computer data storage and transfer operations. This is because it is mechanically a simpler system than the tape decks most commonly used which hold a standard Philips cassette and shown, for example, in U.S. Pat. Nos. 3,394,898 and 3,394,899. More particularly, the present tape holder does not depend on a capstan to advance the tape. Consequently, it does not require the relatively complex cassette shift mechanisms or capstan retract arrangements which are required to position the cassette so that the tape engages the recording head and the capstan projects properly into the cassette.

However, some problems may exist with the edge-loading type of tape holder. The cassette may become hung up on the drive spindles as it is loaded into the cassette holder. Also, the cassette may not be held securely enough, particularly in its loading position, and cassettes have fallen-out of the holder onto the floor, resulting in damage to the tape or cassette.

Other problems have been encountered. For example, edge-loading cassette holders may not be rugged and reliable enough for sustained used, particularly in computer applications. The repeated loading and unloading of the cassettes may affect the tape holder so that it no longer properly positions the cassette. Also, certain parts of the holder may tend to lose their effectiveness because of wear. For example, the bearings on the tape control motor may become excessively worn because of unbalanced loading on the motor shaft. Additionally, many parts of the conventional cassette holder may be inaccessible causing the unit to be relatively difficult to repair and maintain.

SUMMARY OF THE INVENTION

Accordingly, this invention aims to provide an edge-loading tape cassette holder which is rugged and reliable.

Another object of the invention is to provide a cassette holder of this type which precisely locates the cassette in both its loading and operating positions.

Yet another object of the invention is to provide a cassette holder of this general type which can operate for a long period without requiring extensive maintenance.

Yet another object of the invention is to provide an edge-loading cassette holder whose parts are all readily accessible in the event that repairs do become necessary.

A further object of the invention is to provide a tape deck whose cassette does not become hung up on the drive spindles during loading and unloading.

Another object of the invention is to provide a cassette holder which is easy to operate.

A further object is to provide a tape deck which securely holds the cassette in both of its operative positions.

Other objects will in part be obvious and will in part appear hereinafter.

The invention accordingly comprises the features of construction, combination of elements and arrangements of parts which will be exemplified in the construction hereinafter set forth and the scope of the invention will be indicated in the claims.

In general, the present tape deck includes a housing which contains the usual magnetic read/write head and a pair of spaced drive spindles which are arranged to project into sprocket holes in the tape cassette reels. Also included are the necessary electric motors for advancing and rewinding the tape and the various support elements such as relays and switches to control tape movement during the read, write and rewind operations.

The tape cassette used with the present holder is a more or less standard cassette, except for the configuration of the sprocket holes in the tape reels, which will be described in detail later. The cassette is inserted active edge first into the housing so that that edge engages abutments on opposite sides of the recording head. These abutments project into the usual openings in the edge of the cassette near the opposite ends thereof. In prior tape decks, these openings usually receive capstans for moving the tape but, with the present tape deck (which has reel-to-reel drive), the abutments project into the openings to position the cassette vertically and horizontally and also act as guides for the tape moving within the cassette. The active edge of the cassette is retained in this position by a spring-loaded door hinged to the housing and positioned so as to overlie that edge of the casette.

The overlying door edge is specially shaped to cooperate with the boss customarily found on each side of the cassette to help position the cassette in its two stable positions in the holder. In one of these positions, the cassette is contained within the housing with the head engaging the tape in the cassette and the drive spindles projecting into the cassette sprocket holes. In the other stable position, the head still engages the tape, but the cassette is free of the drive spindles and projects partially out of the housing so that an operator can easily grasp it to remove it from the holder.

The holder also includes a bistable latch which cooperates with the cassette to help position the cassette in both its loading and operating positions. If the cassette is in its loading position and the operator moves the cassette to its operating position, the cassette automatically actuates the latch which then locks the cassette in its operating position. When the operator opens the latch to release the cassette from that position, the latch automatically moves the cassette to its loading position. The system is arranged so that a cassette can be loaded into the holder when the latch is in either of its stable positions.

The tape deck's control motor is specially mounted to float with its armature being captured between a flywheel rotating the drive spindle and an idler wheel. Thus, off-axis forces on the motor shaft are equalized, thereby minimizing bearing wear. Operating difficulties due to the cassette jamming in the holder are minimized by a unique spindle-sprocket hole configuration which will be described later. All of these features combine to give the subject tape deck excellent reliability and a long. useful life.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
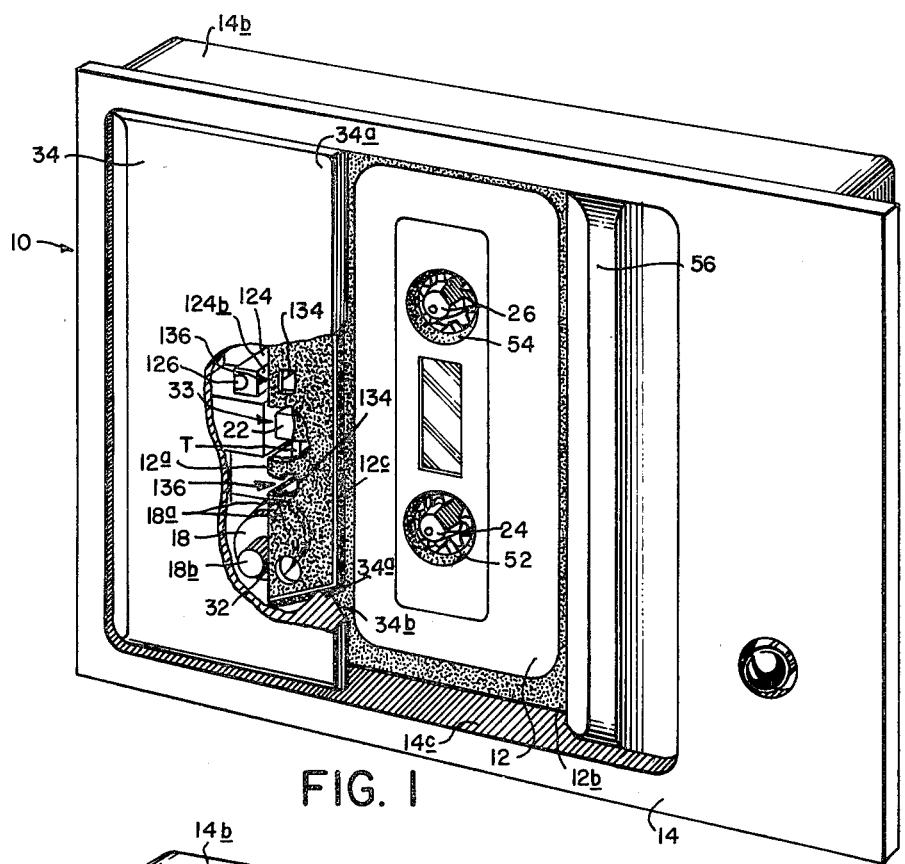
FIG. 1 is a perspective view with parts broken away showing a cassette holder made in accordance with this invention, the cassette being shown in its operating position.
Figure 2:
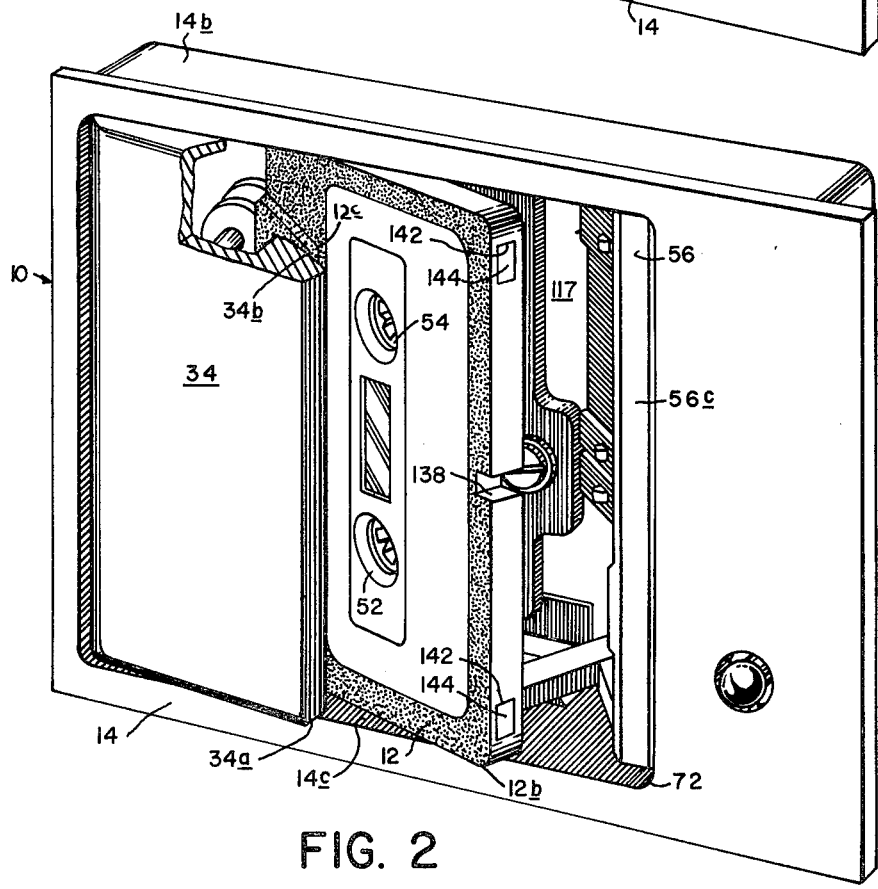
FIG. 2 is a perspective view of the tape holder showing the cassette in its loading position.
Figure 3:
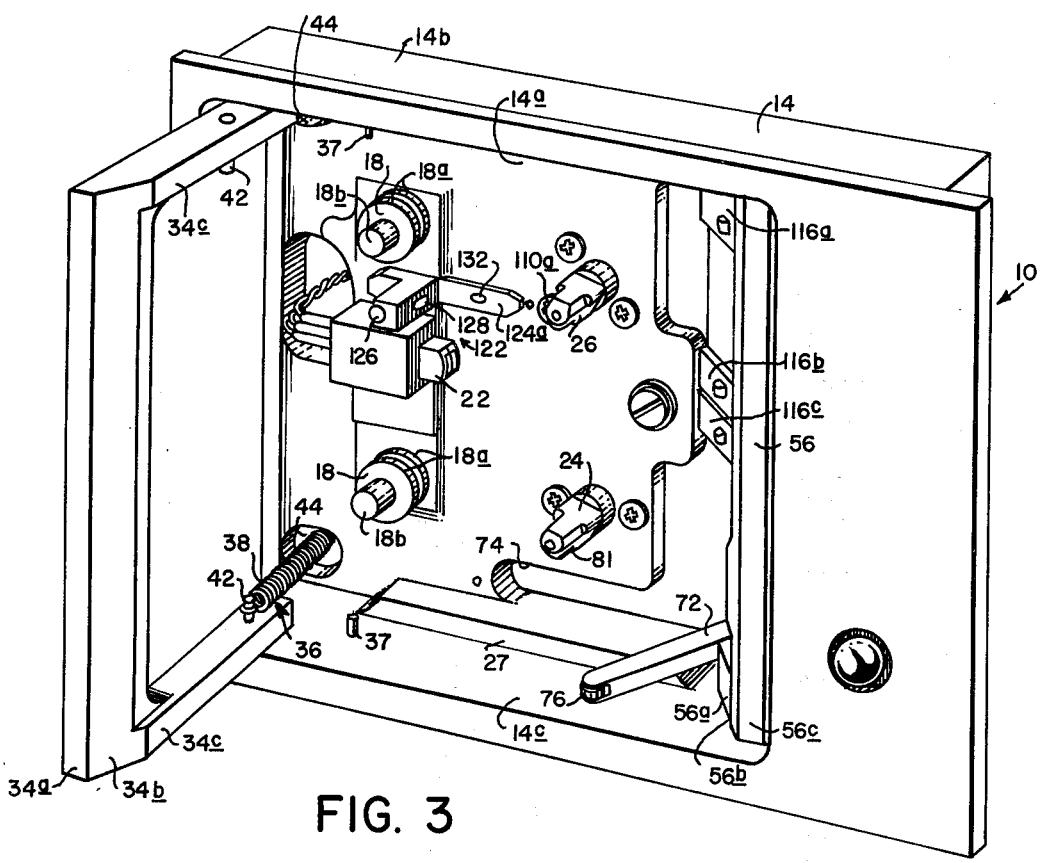
FIG. 3 is a perspective view of the tape holder with the cassette removed and the interior of the holder exposed.

Turning now to FIGS. 1 to 3 of the drawings, the present cassette holder indicated generally at 10 supports and operates a reel-to-reel driven cassette 12. As best seen in FIG. 3, the holder includes a generally rectangular housing 14 having a rear wall 14a on which the various parts of the holder are mounted. More specifically, a pair of vertically spaced, spool-shaped abutments 18 project out from wall 14a into the housing. A conventional magnetic read/write head 22 is mounted directly between abutments 18. Also, vertically spaced, rotatable drive and rewind spindles 24 and 26 project out from wall 16 to the right of these abutments.

As best seen in FIG. 1, cassette 12 is positioned in housing 14 and seated on ledges 27 (FIG. 3) adjacent the walls 14b and 14c so that its active edge 12a engages abutments 18. Actually, the two rims 18a of the abutments project into the openings 32 present near the ends of edge 12a in cassettes of this type. Thus, the ledges 27 and abutments 18 positively locate the cassette in all three dimensions so that a tape segment T exposed in an opening 33 in edge 12a is positioned directly opposite recording head 22.

Figure 4:
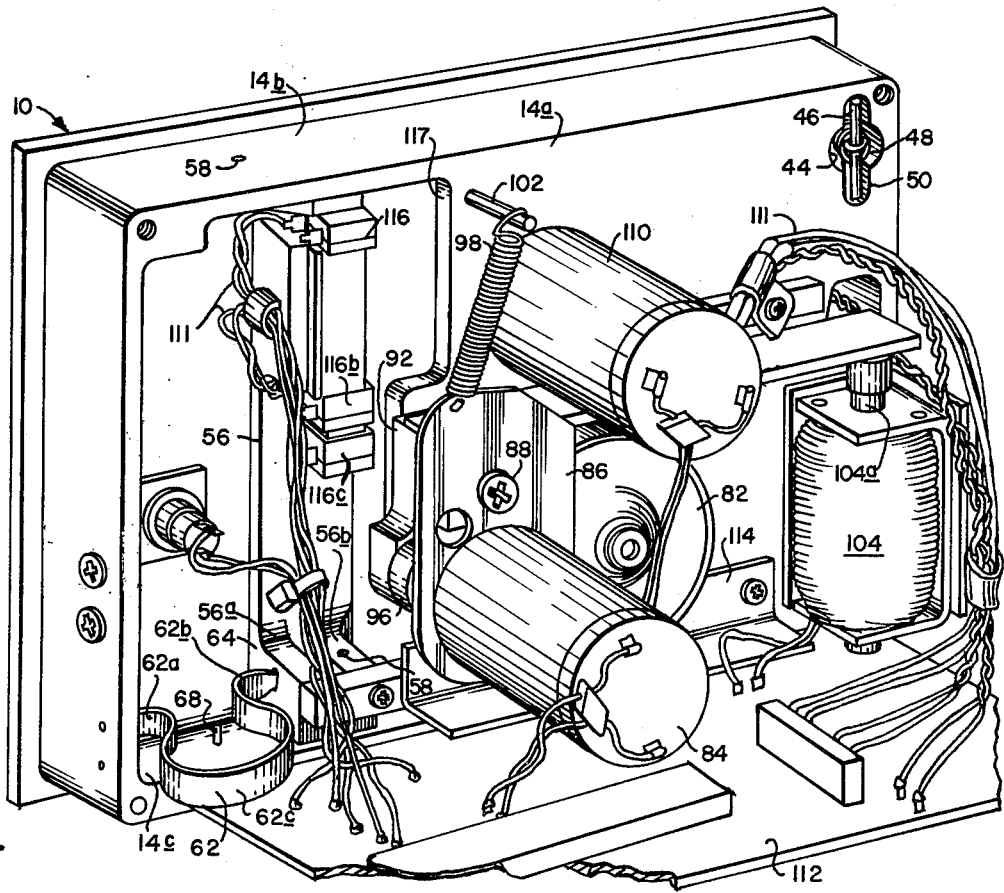
FIG. 4 is a similar view from the rear showing other details of the tape holder.

The cassette edge 12a is retained in this position by a rectangular door 34 hinged at 36 to the upper and lower housing walls 14b and 14c at the left side thereof. The right-hand edge portion 34a of the door overhangs cassette edge 12a and the door is biased to a closed position shown in FIG. 1 wherein it engages the cassette and lugs 37 (FIG. 3) projecting inwardly from the top and bottom housing walls 14b and 14c. More particularly, a pair of springs 38 are located adjacent hinges 36. One end of each spring is secured to a pin 42 projecting from door 34. The other end of each spring extends through an opening 44 in the housing rear wall 14a and is secured to that wall by pin 46 (FIG. 4). The pin extends through an eye 48 at the end of the spring and seats in a suitably shaped recess 50 in the rear face of wall 14a.

The cassette is inserted into the holder 10 edge 12a first. Door edge portion 34a has a beveled surface 34b (FIGS. 1 and 3) presented to the incoming cassette edge which permits the cassette edge to slide into place with the spring-loaded door 34 opening as needed to allow that edge to seat against abutments 18.

The cassette can assume two stable positions in the holder, namely, a loading position illustrated at FIG. 2 and an operating position shown in FIG. 1. In the former position, the cassette is cocked relative to abutments 18 so that its rear edge 12b projects out of the housing 14. Overhanging door edge 34a has flat upper and lower undersurfaces 34c (FIGS. 1 and 3) which lie flush against the side of the usual beveled boss 12c found on each side of cassette 12. The cooperation between these surfaces maintains the cassette at the correct angle relataive to housing rear wall 14a and urges its edge 12a against abutments 18. Desirably, the engaging surfaces cock the cassette so that the sprocket holes 52 and 54 are free of drive spindles 24 and 26 and so that the tape segment T is moved out of firm contact with recording head 22 by virtue of the upper corner of cassette edge 12a wedging against abutment extensions 18b (FIG. 1) and so that the cassette projects out of the housing.

In its operating position shown in FIG. 1, the cassette lies entirely inside the housing with the tape segment T firmly contacting magnetic head 22 and the spindles 24 and 26 projecting into sprocket holes 52 and 54. Now, the door undersurfaces 34c press against the top face of boss 12c to help maintain the cassette in this position. Thus, because of the cooperation between the spring-loaded door 34 and the beveled boss 12c, the cassette constitutes a bistable element which tends to remain in one of its aforesaid two operative positions and not to assume an intermediate position in the holder.

Figure 6:
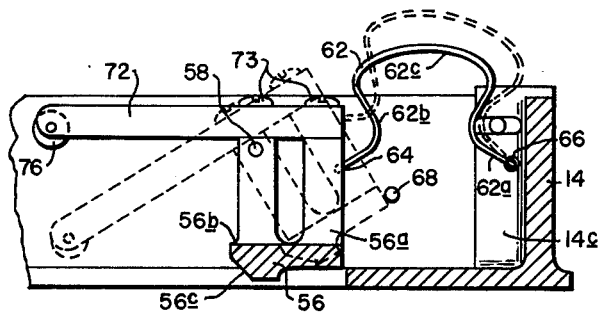
FIG. 6 is a fragmentary sectional view illustrating the holder's latch mechanism in detail.

Referring particularly to FIGS. 1, 2, 4 and 6, the holder 10 also includes a latch shown generally at 56 which is arranged to engage cassette edge 12b to retain the cassette in its two operative positions. Latch 56 is essentially a vertically oriented bar positioned inside housing 14 and extending the entire height of the cassette therein. The bar has upper and lower rearwardly extending legs 56a. These legs are connected by pivots 58 to the upper and lower housing walls 14b and 14c as best seen in FIGS. 4 and 6. Latch 56 is swingable between a closed position shown in solid lines in FIG. 6 and in an open position indicated by dotted lines in that figure and it is fitted with a specially shaped spring 62 adjacent its lower end which tends to maintain the latch in one of these two positions; in other words, the latch is also a bistable element.

Spring 62 is shaped more or less like the cross section of a bell. It has outwardly projecting ends 62a and 62b connected by a domed midsection 62c. The spring is maintained under compression with its end 62b engaged in an opening 64 in latch leg 56a and its other end 62a seated in a slotted rod 66 affixed to the housing bottom wall 14c. As best seen in FIG. 6, when the latch 56 is oriented so that the spring end 62b is positioned on one side of pivot 58, the spring exerts a force tending to rotate latch 56 clockwise to its closed position shown in solid lines. On the other hand, when the latch is turned so that the spring end 62b is situated on the opposite side of pivot 58, the spring exerts a force tending to rotate the latch counterclockwise so that it moves to its open position shown in dotted lines. Pins 68 projecting inward from the housing top and bottom walls 14b and 14c engage the latch when it is fully open to limit its movement.

As shown in FIGS. 2, 3 and 6, a long arm 72 secured by screws 73 to the end of leg 56a projects to the left of the latch behind cassette 12. A slot 74 is provided in the housing rear wall 14a to provide clearance for the arm. When the latch 56 is in its closed position shown in FIG. 1, arm 72 lies in slot 74. On the other hand, when the latch is moved to its open position shown in FIG. 2, arm 72 swings into housing 14 so that a small wheel 76 at the end thereof engages the rear face of the cassette and urges the cassette toward its loading position shown in FIG. 2. By the same token, when the cassette 12 is in its loading position, an inward push on the exposed face of the cassette not only moves the cassette back to its operating position, but also moves arm 72 rearwardly so that it swings latch 56 clockwise, whereupon the latch snaps to its closed position. A lip 56b on the latch engages over cassette edge 12b, securely locking the cassette in place.

As best seen in FIG. 6, the latch 56 also has a beveled surface 56c adjacent lip 56b which enables the cassette to be loaded into the tape holder even when latch 56 is closed. In this situation, the cassette edge 12a is slid into place under door 34 as described above. Then the cassette edge 12b is pushed against the latch surface 56c. The bevel angle of this surface is such that a normal force has a sufficient lateral component to pivot latch 56 counterclockwise in opposition to its spring bias until the cassette edge 12b has cleared the latch lip 56b, whereupon the latch snaps closed, securely locking the cassette in place.

By way of recapitulation, then, the cassette 12 has a stable loading position wherein part of it projects from housing 14 and is readily accessible to the operator. When the cassette is in this position, the operator can withdraw the cassette from the tape holder, leave it alone, or move the cassette to its operating position. In the event that latch 56 is open, the rearward movement of the cassette causes arm 72 to swing the latch closed, locking the cassette in place. If the latch is already closed when the cassette is urged to its operating position, the cassette bears against the latch surface 56c and displaces the latch until it is properly seated, whereupon the latch snaps back over the cassette. In its operating position, the cassette is securely locked in place and properly positioned relative to the recording head 22.

Figure 5:
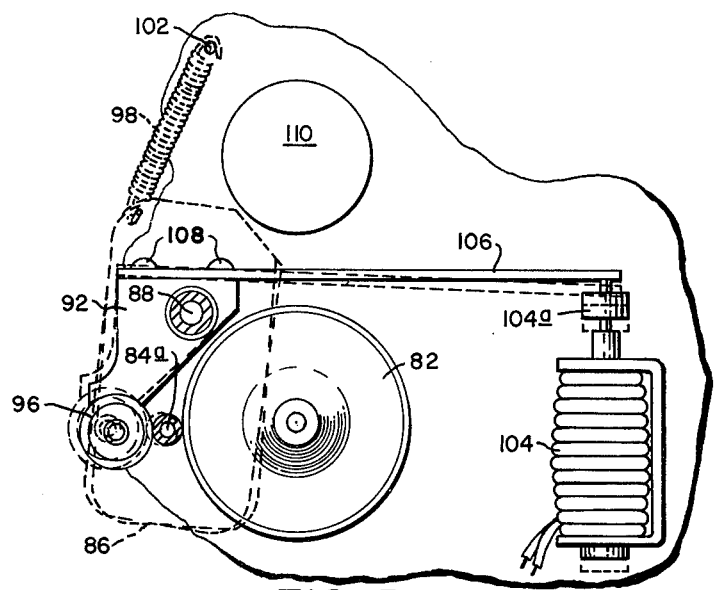
FIG. 5 is a view of the tape holder in rear elevation showing the drive mechanism in greater detail.

Referring now to FIGS. 3 to 5, drive spindle 24 is impaled on one end of a shaft 81 rotatively mounted in housing rear wall 14a. The other end of the shaft is connected to the axis of a rubber-rimmed flywheel 82 positioned behind the rear wall. The flywheel and spindle are rotated by an electric control motor 84 which is mounted on a plate 86 with its shaft 84a (FIG. 5) projecting through the plate. Plate 86 is positioned flush against a bracket 92 which is, in turn, located flush against the rear face of housing wall 14a. Both the plate and the bracket are pivotally connected to the housing wall 14a by a machine screw 88 passing through the plate and bracket and turned down into a correspondingly threaded opening (not shown) in the housing wall 14a.

As best seen in FIG. 5, a small, rubber-rimmed idler wheel 96 is rotatably mounted on bracket 92 with the wheels 82 and 96 and the motor shaft 84a all lying more or less in a straight line. Bracket 92 is swingable between a drive position shown in solid lines in FIG. 5 and an idling position indicated by dotted lines in that figure. In the former position, wheel 96 bears against motor shaft 84 which is free to pivot along with plate 86 about pivot screw 88, so that the shaft is urged into contact with flywheel 82. Thus, the motor shaft 84a is captured between the two wheels 82 and 96 and any rotation of the motor shaft is imparted to the flywheel and spindle 24.

On the other hand, when the bracket 92 is in its dotted line position, wheel 96 is swung away from the motor shaft 84a so that the motor shaft is no longer urged into frictional engagement with the flywheel. Consequently, the rotation of the shaft is not imparted to the flywheel and spindle 24 is stationary. A coil spring 98 connected between plate 86 and a pin 102 projecting from housing wall 14a tends to swing the plate 86 clockwise about its pivot screw 88 so that the shaft and bracket 92 are biased toward their dotted line positions, with the result that shaft 84a is normally disengaged from the flywheel.

The shaft is moved against the flywheel by the actuation of a control motor solenoid 104 mounted on housing wall 14a. The solenoid armature 104a butts against one end of a relatively long lever arm 106 whose other end is connected to bracket 92 by screws 108. When solenoid 104 is energized, its armature is driven against lever arm 106. This movement of the arm pivots bracket 92 counterclockwise about screw 88 so that wheel 96 is swung against motor shaft 84a which is, in turn, urged against flywheel 82 causing rotation of that element and its associated spindle 24.

It is important to note that when the system is in this drive mode, motor shaft 84a, although captured between wheels 82 and 96, floats on bracket 86 independently of bracket 92 so that there is little or no net lateral or off-axis force exerted on the motor shaft that might tend to cause uneven wear of the motor shaft bearings or the wheels. This feature contributes significantly to the reliability and long life of the present system.

Referring to FIGS. 3 and 4, an electric tension motor 110 is mounted on the rear face of housing wall 14a. Its motor shaft 110a passes through that wall and extends axially through spindle 26. In use, motor 110 maintains the proper amount of tension on the tape and rewinds the cassette.

Connections to the aforementioned electromechanical components are made by way of harnesses 111 and a printed circuit board 112 secured to housing wall 14a by bracket 114. As best seen in FIGS. 2 and 4, microswitches 116a, 116b, 116c are mounted on latch 56, a suitable opening 117 being provided in housing rear wall 14a to provide clearance which latch 56 is closed. When cassette 12 is in its operating position, microswitch 116b or 116c (depending on which side of the cassette is being used) extends into a recess 138 in the cassette edge 12b and remains open. The other switch of that pair bears against that edge and is closed. This switch configuration indicates the side of the cassette being used at the particular time and removes the unloaded interlock condition permitting tape motion upon command. Also, if the write-protect recesses 142 customarily found on these cassettes at the ends of edge 12b are opened by removing the protect tab 144, microswitch 116a extends into this recess and inhibits a write operation on the side of the tape being used at the time.

Figure 7:
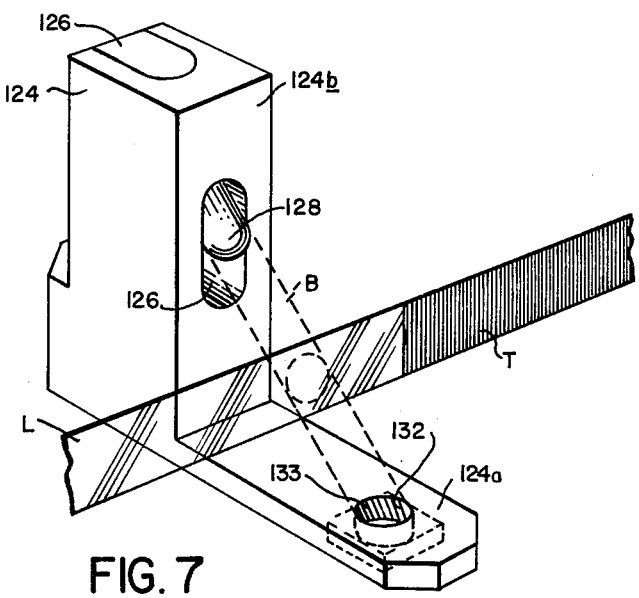
FIG. 7 is an enlarged fragmentary perspective view of the end-of-tape sensor incorporated into the holder.

Referring now to FIGS. 1, 3 and 7, the present system utilizes an optical end-of-tape detector shown generally at 122 to signal when the tape in the cassette is nearing the end of its travel during the rewind operation. The detector 122 is comprised of a generally L-shaped bracket 124. One leg 124a of the bracket is mounted flush against housing rear wall 14a, while the other bracket leg 124b projects out from that wall adjacent to recording head 22. A passage 126 extends from the end of leg 124b diagonally through that leg toward the housing rear wall 14a. This opening contains a long, thin light bulb 128 whose beam B is directed toward bracket leg 124a. A small photosensitive elemet 132 is mounted in an opening in bracket leg 124a directly in line with the beam from the bulb 128.

As seen in FIG. 1, like the standard Philips cassette, cassette 12 is provided with openings 134 through the sides of the cassette near its active edge 12a on each side of the opening 33. Likewise, it has the usual openings 136 in the active edge 112a adjacent these side openings. In the standard cassette system, these side openings 134 mate with projections from the holder for alignment and have also been used to receive a projecting end-of-tape detector. In the present system, openings 134 and 136 are used as windows through the cassette for end of tape detection.

More particularly, when the cassette is in place in its operating position shown in FIG. 1, an opening 136 in cassette edge 12a is positioned opposite bulb 128. Also, an opening 134 in the underside of the cassette is positioned opposite photosensitive element 132. The tape inside the cassette is provided with a transparent leader L. The magnetic oxide on the tape renders the tape opaque to light so that light is incident on element 132 only when leader L is drawn between the bulb and the element.

During normal forward operation, solenoid 104 is energized so that motor 84 drives wheel 82 and its associated drive spindle 24, whereupon tape motion is controlled directly by the control and tension motors 84 and 110. For a rewind operation, control motor solenoid 104 is de-energized. This allows motor 84 to move away from wheel 82 permitting the drive spindle 24 to rotate freely. Simultaneously, the tension motor 110 is turned on at constant speed to rewind the tape at a relatively high speed on the order of 100 inches per second to the beginning of the clear tape leader L. The light transmitted through leader L is detected by sensor 122 which is immediately activated to stop tape motion. With this feature of the present system, end-of-tape is detected by detector 122 which does not hinder cassette insertion and removal by projecting into openings in the cassette.

When cassette 12 is being urged from its loading position shown in FIG. 2 to its operation position illustrated in FIG. 1, the cassette sprocket holes 52 and 54 may not be perfectly aligned to accept the drive spindles 24 and 26. If one uses the standard three-rib spindle and six-pin sprocket hole configuration in an edge-loading tape system, the cassette reels tend to hang up on the spindles and the cassette tends to jam as it is loaded into the holder. To overcome these problems, an entirely new spindle-sprocket hole configuration has been devised which is illustrated in FIGS. 8 to 12.

Drive spindles 24 and 26 are identical, as are the sprocket holes 52 and 54. Consequently, we will describe in detail only the spindle 24 and its mating sprocket hole 52 formed in a reel 152.

Figure 11:
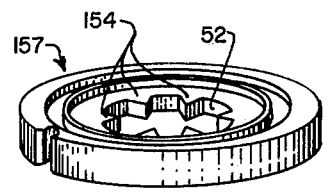
FIG. 11 is a perspective view showing the cassette reel of this invention in greater detail.

The sprocket hole 52 in reel 152 is generally circular. A plurality, herein six, small, triangular, equilateral teeth 154 project from the edge of the hole toward its center. Teeth 154 are distributed evenly around the sprocket hole and they extend the full depth of the hole as best seen in FIG. 11. The teeth have very smooth surfaces and the material from which the reel 152 is made is hard and wear-resistant. Consequently, the teeth 154 retain their shape and sharp edges even after the cassette has been in use for a long period of time.

The spindle 24 is formed of the same hard, wear-resistant material as the reel. It is impaled on shaft 81 and secured thereto by a pin 156 driven into the side of the spindle and through the shaft.

The spindle is composed of a cylindrical lower portion 158 whose diameter is slightly less than the sprocket hole 152. It also has a generally triangular midportion shown generally at 161 and a more or less cylindrical upper portion 162. The corners 164a to 164c of portion 161 are generally rounded with a radius of curvature very slightly less than that of portion 158. These corners are separated by flat faces 166a and 166c forming shoulders 168a to 168c where these faces join the cylindrical spindle portion 158.

The flat faces 166a to 166c extend up into spindle portion 162 so that they interrupt the generally cylindrical shape of that portion. In other words, portion 162 consists of three arcuate segments 172a to 172c separated by the flat faces 166a to 166c. The radius of curvature of the arcuate segments is somewhat less than that of the triangular corners 164a to 164c so that pronounced shoulders 178a to 178c are formed between the arcuate segments in portion 162 and the triangular segments in portion 161.

Figure 8:
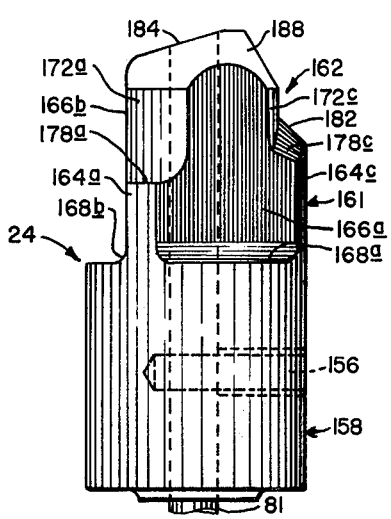
FIGS. 8 and 9 are elevational views of the holder's drive spindles viewed from two points 90° apart.
Figure 9:
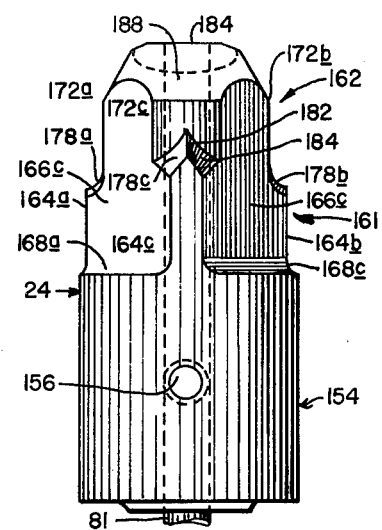

Two of these shoulders, namely, shoulders 178a and 178b are located about one-third of the way down on the spindle 24. The remaining shoulder 178c is situated somewhat higher up on the spindle. Furthermore, that shoulder is specially shaped with a sharp declining ridge 182 (FIG. 8). The shoulder falls away steeply on both sides of ridge 182 like a roof forming a pair of inclined surfaces 184 (FIG. 9). The lower edges of these surfaces are contiguous with the adjacent vertical faces 166a and 166c.

Figure 10:
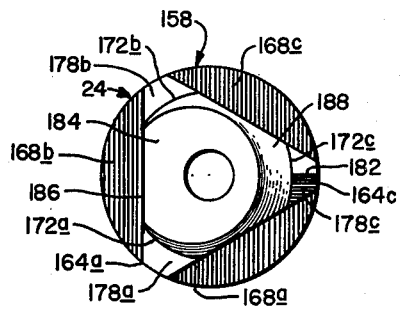
FIG. 10 is a top view of the FIG. 8 spindle.

Spindle portion 162 has a flat, canted top face 184. The face is generally circular, but it has a flat edge 186 (FIG. 10) situated on the side of the spindle directly opposite ridge 182. Face 184 slants downward toward the straight edge 186 as best seen in FIG. 8. The part of spindle portion 162 between the arcuate segment 172c and the top surface 184 is gently curved at 188. As shown in FIG. 10, this curvature becomes more pronounced as one proceeds from that point around the spindle toward the flat edge 186.

Figure 12:
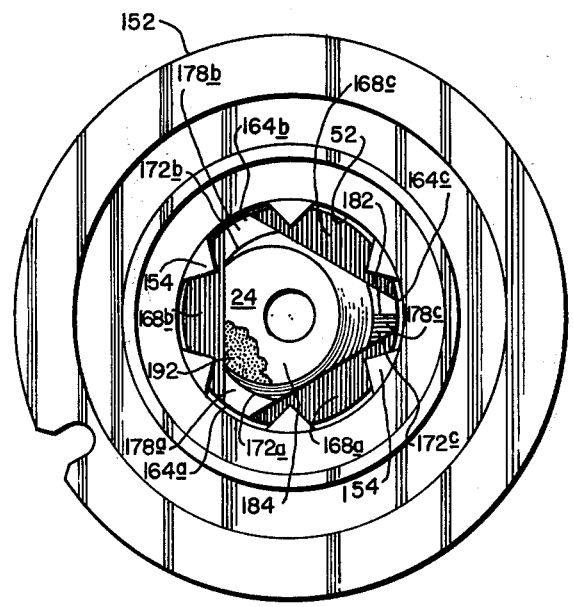
FIG. 12 is a top view on a larger scale showing the FIG. 11 cassette reel impaled on the FIG. 10 drive spindle.

Referring now to FIG. 12, when cassette 12 is moved to its operating position, reel 152 is swung against the spindle 24 so that the spindle is received in the sprocket hole 52. If the corners of the spindle 164a to 164c are oriented just right relative to the teeth 154, the spindle will project cleanly into the sprocket hole. More often than not, however, they will not line up this way. Rather, the spindle corners 164a to 164c may underlie three of the reel teeth 154. In this event, shoulder 178c being higher than the other two shoulders 178a and 178b, tends to cock the reel slightly. Furthermore, the sharp ridge 182 on shoulder 178c engaging the opposing tooth which is also cocked, tends to slide along the edge of that tooth, so that the reel and/or spindle 24 turn slightly until spindle corners 164a to 164c are no longer aligned with the teeth 154, whereupon the reel is free to seat on the spindle.

In other orientations of the spindle relative to the reel, the smooth, sharp ridge 182 on the spindle will engage one or another of the sharp edges on a tooth 154 so as to change the relative orientation of the spindle and reel enough to permit the reel to seat properly on the spindle. The canted spindle top face 184 of the spindle also helps in this respect as does the rounded surface 188 adjacent that top wall. Applicant has found, after very extensive testing, that with the spindle-sprocket hole configuration shown herein, the cassette 12 does not become hung up on the drive spindles during loading and does not become jammed in the cassette holder due to misalignment between the spindles and reels.

In a preferred embodiment of the invention, the top face 184 is covered with a reflective material such as aluminum paint as indicated at 192 in FIG. 12. Thus, when the cassette 12 is loaded as in FIG. 1 and the unit is in operation, the canted reflective top wall 184 nutates. This appears to the operator as a flickering light by which he can tell that the system is actually in the process of advancing or rewinding tape in the cassette. Alternatively, a dot of white paint could be placed at 192 for this purpose with movement of the dot indicating operation.

It will be seen from the foregoing, then, that the present cassette holder is quite rugged and reliable. It does not require a capstan to advance the tape and has fewer parts than a comparable holder for a standard cassette and its motor drive system suffers minimum wear. Consequently, the frequency of repair should be low. Furthermore, when repairs do become necessary for one reason or another, all of the parts in the holder are readily accessible. The door 34 can be swung fully open as shown in FIG. 3 where it assumes an over-center position so that it remains open until closed by the operator. Thus, the removal of the cassette and the opening of door 34 exposes all of the parts inside housing 14. The remaining parts of the cassette holder such as the control and tension motors are readily accessible from behind the housing.

Further, the holder is designed to reliably secure the cassette, particularly in its loading position, so that it cannot fall out of the holder. Yet, it can readily be removed from the holder or moved to its operating position by the operator using only one hand. Moreover, when the cassette is in its operating position, it is precisely positioned relative to the recording head and positively locked in place.

Still further, the unique optical end-of-tape sensor which utilizes the capstan access openings in the cassette as windows through which to project a light beam provides a very reliable method of controlling tape movement at the end of the tape travel.

Finally, the subject tape holder relies on the cooperation between uniquely configured spindles and sprocket holes to minimize hang up and jams of the cassette in the holder further assuring reliable operation of the unit.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of of the invention herein described.

We claim:

1. An edge-loading cassette holder comprising:
   A. a housing
   B. a magnetic head within the housing,
   C. a pair of drive spindles projecting into the housing,
   D. means within the housing for resiliently retaining and positioning the active edge of the cassette relative to the head so that the cassette is swingable between
      1. an operating position wherein it is entirely within the housing with the spindles projecting into the cassette, and
      2. first and second loading positions wherein it is free of the spindles and projecting partially out of the housing, and
   E. a bistable latch hinged to the housing and movable between stable open and closed positions, said latch
      1. being shaped and arranged to overlie and retain the cassette in its operating position when closed and to engage from the rear and support the cassette in said first loading position when open, and
      2. having an oblique surface which engages an edge of the cassette opposite its said active edge when the latch is closed so as to support the cassette in said second loading position, said surface being oriented so that when the cassette is pushed toward its operating position, the resultant lateral force component moves the latch only partway toward its open position to permit the cassette to seat in its said operating position whereupon the latch returns to its said closed position and engages over said opposite edge of the cassette.

2. The holder defined in claim 1 wherein the retaining and positioning means comprise:

A. a door-like member hinged to the housing so that the member edge opposite the hinge overlies the active edge of the cassette in the holder, and B. means for urging the member against the cassette.

3. The holder defined in claim 2 wherein the retaining and positioning means further comprise:

A. a pair of abutments secured inside the housing on opposite sides of the head and positioned to engage the cassette in both its loading and operating positions, and, B. a pair of spool-shaped members adjacent to the abutments which project into the cassette to help position the cassette in its operating position and also to provide guides for tape moving in the cassette.

4. The holder defined in claim 1 and further including:

A. a first wheel connected to one of the spindles,

B. a second wheel coplanar with the first wheel,

C. means for mounting the second wheel to the housing so as to be swingable toward and away from the first wheel, D. an electric motor, E. means for mounting the motor in the housing independently of the two wheels so that a shaft extends between the rims of the wheels and normal thereto, and F. means for moving the second wheel between 1. a first position wherein the shaft is captured between the first and second wheels whereby any rotation of the shaft is imparted to the spindle without any off-axis forces being applied to the shaft, and 2. a second position wherein the shaft is not captured and urged into engagement with the first wheel so that the spindle is free to idle.

5. The holder defined in claim 1 wherein each spindle has an upper section whose cross-section is generally triangular in shape with rounded corners so that said section has three facets separated by rounded edges and means defining a shoulder on each of said edges, the shoulder on at least one of said edges being closer to the top of the spindle than the shoulders on the other edges.

6. The holder defined in claim 5 and further including means defining a sloping peak on the shoulder on said one edge.

7. A cassette holder comprising:

A. a housing,

B. a drive spindle rotatively mounted in the housing,

C. a first wheel secured co-axially to the spindle,

D. a second wheel rotatively mounted to the housing coplanar with the first wheel so as to be swingable toward and away from the first wheel, E. an electric motor, F. means for mounting the motor in the housing independently of the two wheels so that its shaft extends between the rims of the wheels, and G. means for moving the second wheel between a first position wherein the shaft is captured between the first and second wheels and is engaged on diametrically opposite sides thereby so as to equalize lateral forces on the shaft as it rotates and a second position wherein the shaft is not captured and urged into engagement with the first wheel whereby the spindle is free to idle.

8. The cassette holder defined in claim 7, wherein each drive spindle has an upper section whose cross-section is generally triangular in shape with rounded corners so that said section has three facets separated by rounded edges, and means defining a shoulder on each of said edges, the shoulder on at least one of said edges being closer to the top of the spindle than the shoulders on the other two edges.

9. A cassette holder comprising a housing, and a pair of drive spindles projecting into the housing, each spindle having an upper section whose cross-section is generally triangular in shape with rounded corners so that said section has three facets separated by rounded edges, and means defining a shoulder on each of said edges, the shoulder on at least one of said edges being closer to the top of the spindle than the shoulders on the other two edges.

* * * * *